United States Patent
Smale et al.

[11] 3,712,547
[45] Jan. 23, 1973

[54] VARIABLE CONVERGENT-DIVERGENT JET PROPULSION NOZZLE

[75] Inventors: Charles H. Smale; Esten W. Spears, Jr., both of Indianapolis, Ind.

[73] Assignee: General Motors Corporation, Detroit, Mich.

[22] Filed: Oct. 1, 1971

[21] Appl. No.: 185,525

[52] U.S. Cl............................................239/265.39
[51] Int. Cl..................................................B64c 15/08
[58] Field of Search.......239/265.19, 265.33, 265.37, 239/265.39; 60/35.6

[56] References Cited

UNITED STATES PATENTS

| | | | |
|---|---|---|---|
| 3,048,973 | 8/1962 | Benedict | 239/265.39 X |
| 3,367,579 | 2/1968 | Mehr | 239/265.39 X |
| 3,454,227 | 7/1969 | Motycka | 239/265.39 |

*Primary Examiner*—M. Henson Wood, Jr.
*Assistant Examiner*—Michael Y. Mar
*Attorney*—Paul Fitzpatrick et al.

[57] ABSTRACT

A variable convergent-divergent jet propulsion nozzle includes a jet pipe conducting gas under pressure, a ring reciprocable by power axially of the exterior of the jet pipe, a ring of flaps defining a converging nozzle section pivoted on the reciprocable ring, and a ring of flaps defining the diverging downstream portion of the nozzle pivoted to the convergent flaps near the downstream end of the convergent flaps. When the flaps are moved rearwardly by power, a cam and roller type girdle closes in the divergent portion of the nozzle, and with it the convergent portion. A ring of fairing flaps each fixed onto the exterior of one of the divergent flaps creates a boattail fairing. These cooperate with tracks which guide the assembly of boattail and divergent flaps as it is projected or retracted.

4 Claims, 6 Drawing Figures

PATENTED JAN 23 1973
3,712,547
SHEET 1 OF 2
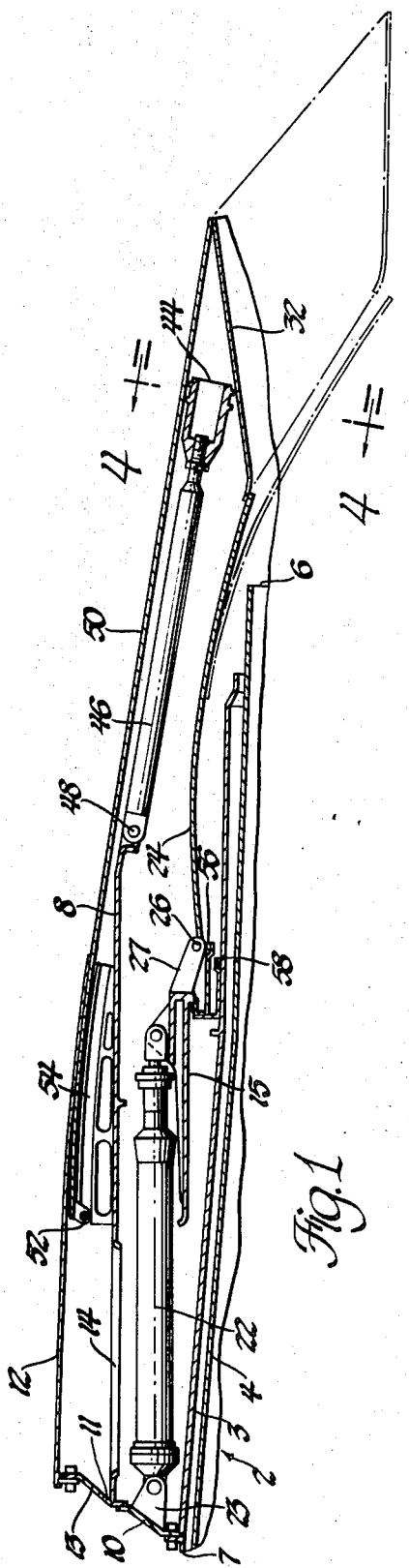
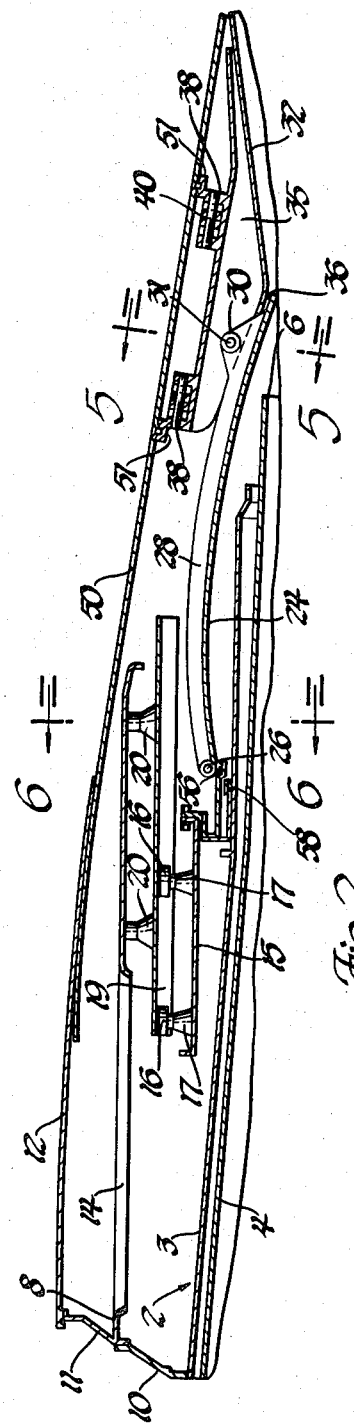
INVENTORS
Charles H. Smale, &
BY Esten W. Spears, Jr.
Paul Fitzpatrick
ATTORNEY INVENTORS
Charles H. Smale, &
BY Esten W. Spears, Jr.

Paul Fitzpatrick
ATTORNEY

VARIABLE CONVERGENT-DIVERGENT JET PROPULSION NOZZLE

Our invention relates to jet propulsion nozzles such as are used with turbojet and other engines for high speed propulsion of aircraft. It is particularly directed to improvements in nozzles of the variable convergent-divergent type which, as is well known, are employed with jet engines for aircraft which have a wide speed range, particularly those in which an afterburner is provided so that a substantial variation in jet nozzle area is required between dry and afterburning operation. One example of such a propulsion nozzle is disclosed in Spears et al. U.S. Pat. No. 3,004,385, Oct. 17, 1961.

The principal object of our invention is to provide a convergent-divergent jet propulsion nozzle better adapted to the requirements of practice than those commonly used. Other objects of our invention include the provision of such a nozzle of lighter weight than those commonly employed, one which is infinitely variable in area, one which has a low angle of divergence of the divergent portion of the nozzle in all degrees of opening, one which has a low parasitic drag, one which has minimum cooling requirements because of the relation of the movable nozzle flaps to the jet pipe on which they are mounted, and one which is simple in structure and well adapted to stand the high temperature flow of gas at high pressure encountered in such nozzles.

The nature of our invention and its advantages will be apparent to those skilled in the art from the succeeding detailed description of the preferred embodiment and the accompanying drawings.

FIG. 1 is a sectional view, taken in a plane containing the axis of symmetry thereof, of an annular variable area jet nozzle.

FIG. 2 is a similar view, taken in a plane angularly displaced from the plane of FIG. 1.

Figure 3:
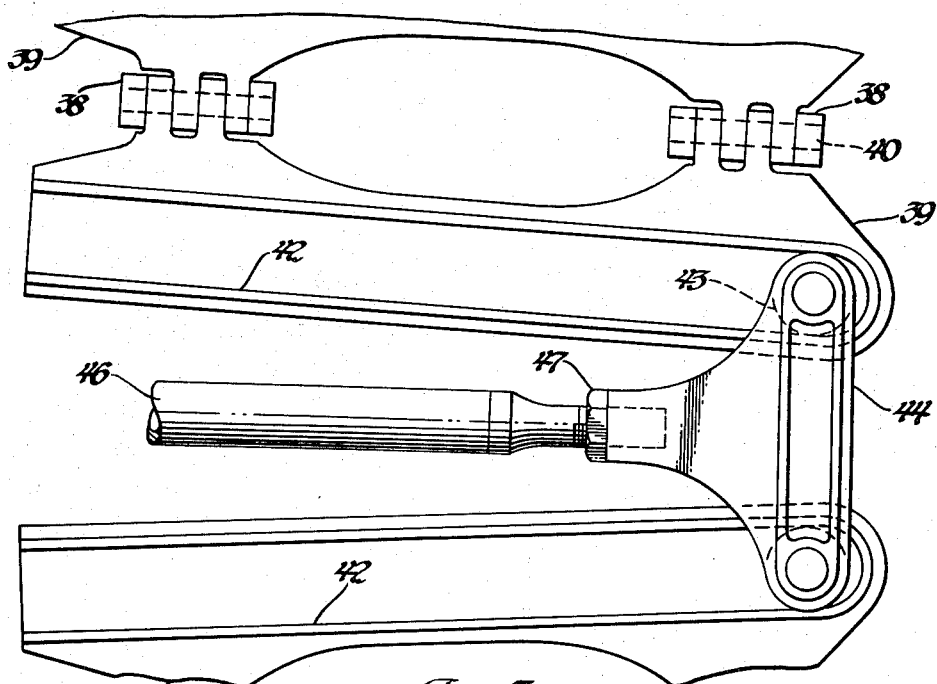
FIG. 3 is a fragmentary plan view illustrating the nozzle closing cam arrangement.

Referring first to FIGS. 1 and 2, the preferred installation of our invention includes a jet pipe or exhaust pipe 2 which is a slightly converging duct carrying the combustion products from a gas turbine engine. The diameter of the jet pipe is about eight-tenths of the length of the jet pipe and nozzle structure illustrated.

The jet pipe is double-walled, having an outer wall 3, which is a primary structural strength and pressure-containing wall of circular cross section, and an inner wall or liner 4 separated from the wall 3 by a cooling air space. The liner bounds a space in which an afterburner (not illustrated) is mounted for reheating the combustion products as and when desired. The jet pipe terminates in an outlet at 6 from which the propulsive jet is discharged into the nozzle structure of our invention. The upstream end of the outer wall 3 is bolted to the downstream end of an engine exhaust pipe 7 into which inner wall 4 extends.

A nozzle support ring 8 of heavy sheet metal is bolted at its forward edge to a flange 10 extending outwardly from the forward end of wall 3. The upstream end of ring 8 bears an outwardly extending flange 11 to which is removably secured a slightly tapering fairing 12 of circular cross section, this defining the outer boundary of the nozzle assembly. Flanged cutouts 14 in the nozzle support ring reduce its weight and provide for flow of cooling air into the interior of the ring. Such cooling air may enter from any suitable source through holes such as 13 in flange 11.

Figure 6:
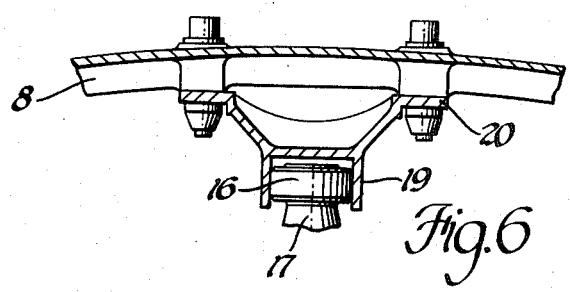
FIG. 6 is a fragmentary sectional view taken in the plane indicated by the line 6—6 in FIG. 2.

Variation of the configuration of the nozzle is effected by an operating ring 15, guided for movement axially of the jet pipe by six pairs of rollers 16 rotatably mounted on posts 17 fixed to the ring 15 (see also FIG. 6). Each pair of rollers traverses a channel section track 19 integral with brackets 20 by which it is bolted to the support ring 8. This mounting tolerates radial expansion of the parts and provides for free movement of the operating ring 15 axially of the jet pipe. As shown, ring 15 is in its forward limit of travel; that is, for wide open nozzle.

The operating ring is moved by six equi-spaced operating cylinders or actuators 22 coupled to the ring and coupled to brackets 23 extending from flange 10. Any suitable means for operating and synchronizing these actuators, as well known in the art, may be employed so that the ring 15 is moved by the six actuators while remaining perpendicular to the jet pipe axis.

Figure 5:
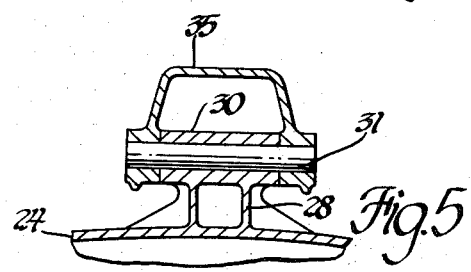
FIG. 5 is a fragmentary sectional view taken in the plane indicated by the line 5—5 in FIG. 2.

The converging part of the jet nozzle is defined by a ring of eighteen flaps 24 which overlap at their lateral margins, as is well understood, and which are swingable about hinge pins 26 mounted in brackets 27 extending from the rear edge of operating ring 15. Each flap 24 includes a box section stiffening rib 28 (see also FIG. 5) which is integral with a hinge element 30 supporting a pin 31 which couples the convergent flaps 24 to the divergent flaps outward and downstream of them.

There is a ring of eighteen divergent flaps 32 (see also FIG. 4) with the margins overlapping as indicated at 34 and overlapping farther as the nozzle is closed. Each divergent flap 32 is borne by an axially extending box section support 35, these being aligned with the ribs 28 on the converging flaps and defining a clevis for the hinge pins 31. Thus, each divergent flap is hinged to a convergent flap by pin 31 adjacent to the downstream end of the convergent flap and slightly upstream of the beginning of the effective portion of the convergent flap. It will be noticed, as shown in FIGS. 1 and 2, that there is a slight axial overlap and a slight radial gap between the two sets of flaps, as indicated at 36. Thus, the gas flowing from the convergent flaps is directed to the interior of the divergent flaps and, by ejector action, some air which is cooler than the propulsive gases is drawn through the gap at 36 and serves to film cool the divergent flaps to some extent.

Figure 4:
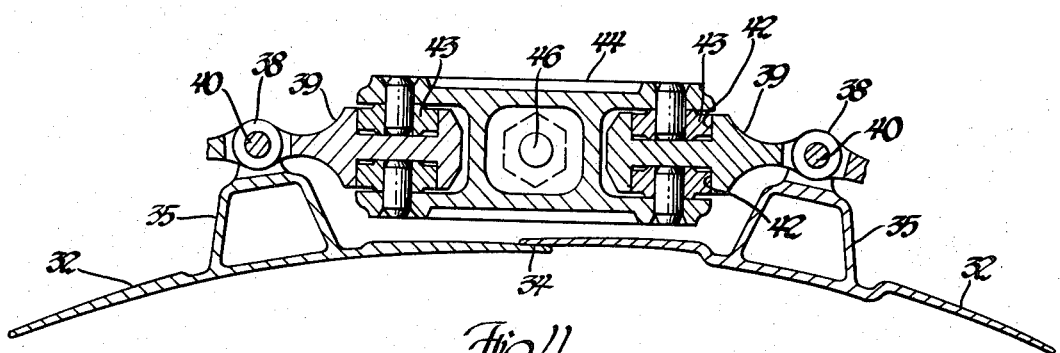
FIG. 4 is a cross sectional view of the same taken in the plane indicated by the line 4—4 in FIG. 1.

Each support 35 includes two upstanding pairs of brackets 38 defining parts of aligned hinge joints which couple the divergent flaps 32 to cams 39 forming parts of a drawstring nozzle closing device to be described. As shown clearly in FIG. 3, the bracket 38 at each of the adjacent cams 39 bears two knuckles which are coupled by a hinge pin 40 to the cams 39. Each cam 39 defines two cam tracks 42 on opposite faces of the cam, these cam tracks of adjacent cams diverging in the direction toward the upstream end of the jet pipe, as shown in FIG. 3. The cam tracks are occupied by rollers 43 mounted, as shown in FIGS. 3 and 4, on a roller carrier 44 (see also FIG. 1) which is threaded onto the end of a strut 46 and secured by a jam nut 47. There are eighteen such roller carriers and struts, and each strut is fixed by a swing joint at 48 to the nozzle support ring 8. Thus, the roller carriers 44 may swing radially in and out but are restrained against movement axially of the jet pipe.

As a result of this, when the actuators 22 move the operating ring 15 rearwardly of the tailpipe, the ring of convergent flaps 24 is carried rearwardly by hinge pins 26 and these carry with them the ring of divergent flaps 32 through pins 31. As the divergent flaps move rearwardly, the cam tracks 42 traveling past the rollers 43 pull the divergent nozzle flaps progressively into a smaller radius as the rearward movement proceeds. Through the hinge connection 31 between the two sets of flaps, the convergent flaps are forced inwardly along with the divergent flaps, and the nature of the movement will be apparent from the broken lines in FIG. 1 which show the final closed position of the nozzle as compared to the open position in solid lines. Closing is resisted by pressure within the nozzle, which pressure acts to open the nozzle when operating ring 15 is moved forwardly.

The nozzle assembly also includes a ring of eighteen boattail fairing flaps 50 of sheet metal, each of which is fixed to a support 35. As illustrated in FIG. 2, the hinge joint brackets 38 include flanges 51 to which the boattail fairing flaps 50 are fixed by suitable fasteners so they are rigid with supports 35 and flaps 32. The upstream ends of the boattail fairing flaps are slidably received within the downstream end of the annular fairing 12 and are guided by two followers 52 at the forward end of each boattail fairing flap. Each follower is guided by a track 54 fixed to the exterior of the nozzle support ring 8 (thirty-six tracks in all).

The gap between tailpipe 2 and operating ring 15 is closed against escape of exhaust gas by two annular seals mounted on ring 15. Seal 56 cooperates with the upstream ends of flaps 24 at the hinge joint, and seal 58 slides over outer wall 3 as ring 15 is shifted.

We have described a nozzle having eighteen flaps in each ring and corresponding numbers of other parts. Obviously, these figures may be changed if desired.

As will be seen upon consideration of the description of the preferred embodiment of our invention, it provides a structure very well adapted to satisfy the objects outlined in the beginning of this description. Particularly, it will be noted that there is a small angle of convergence of the boattail, a very low boattail drag, a very small divergence angle of the divergent flaps, a simple mechanical linkage, and an arrangement in which the convergent flaps are largely shielded from the hot gas when the nozzle is open and temperatures are high because of afterburning operation.

The detailed description of the preferred embodiment of the invention for the purpose of explaining the principles thereof is not to be considered as limiting or restricting the invention, since many modifications may be made by the exercise of skill in the art.

We claim:

1. A variable convergent-divergent jet propulsion nozzle comprising, in combination, a jet pipe terminating in an outlet, an operating ring translatable axially of the exterior of the jet pipe, an inner ring of flaps hinged at their forward ends to the operating ring, the said flaps having a retracted position in which the downstream ends of the flaps are approximately coterminous with the jet pipe and a projected position in which the flaps extend principally beyond the jet pipe outlet; an outer ring of flaps surrounding the inner ring and extending downstream from the inner ring, the outer ring flaps having their upstream ends guided for reciprocation axially of the jet pipe and being hinged to the inner ring flaps near the downstream end of the inner flaps; and a linkage interconnecting the outer ring flaps effective to reduce the diameter of the outer flap ring and thereby the diameter of the inner flap ring upon translation of the operating ring and flaps rearwardly of the jet pipe; the inner ring flaps defining a convergent nozzle section and the outer ring flaps defining a divergent nozzle section.

2. A variable convergent-divergent jet propulsion nozzle comprising, in combination, a jet pipe terminating in an outlet, an operating ring translatable axially of the exterior of the jet pipe, an inner ring of flaps hinged at their forward ends to the operating ring, the said flaps having a retracted position in which the downstream ends of the flaps are approximately coterminous with the jet pipe and a projected position in which the flaps extend principally beyond the jet pipe outlet; an outer ring of flaps surrounding the inner ring and extending downstream from the inner ring, the outer ring flaps having their upstream ends guided for reciprocation axially of the jet pipe and being hinged to the inner ring flaps near the downstream end of the inner flaps; and a linkage interconnecting the outer ring flaps effective to reduce the diameter of the outer flap ring and thereby the diameter of the inner flap ring upon translation of the operating ring and flaps rearwardly of the jet pipe; the inner ring flaps defining a convergent nozzle section and the outer ring flaps defining a divergent nozzle section and a boattail fairing.

3. A variable convergent-divergent jet propulsion nozzle comprising, in combination, a jet pipe terminating in an outlet, an operating ring translatable axially of the exterior of the jet pipe, an inner ring of flaps hinged at their forward ends to the operating ring, the said flaps having a forward position in which the flaps are largely retracted over the jet pipe and a rearward position in which they are largely projected beyond the jet pipe outlet; fixed to an outer ring flap and extending forwardly exteriorly of the operating ring; and means fixed to the jet pipe guiding the forward ends of the fairing flaps for reciprocation axially of the nozzle and thereby further locating the outer ring flaps.

4. A variable convergent-divergent jet propulsion nozzle comprising, in combination, a jet pipe terminating in an outlet, an operating ring translatable axially of the exterior of the jet pipe, an inner ring of flaps hinged at their forward ends to the operating ring, the said flaps having a forward position in which the flaps are largely retracted over the jet pipe and a rearward position in which they are largely projected beyond the jet pipe outlet; an outer ring of flaps surrounding the inner ring and extending downstream from the inner ring, the outer ring flaps having their upstream ends guided for reciprocation axially of the jet pipe and being hinged to the inner ring flaps near the downstream end of the inner flaps; and a linkage interconnecting the outer ring flaps effective to reduce the diameter of the outer flap ring and thereby the diameter of the inner flap ring upon translation of the operating ring and flaps rearwardly of the jet pipe; the inner ring flaps defining a convergent nozzle section and the outer ring flaps defining a divergent nozzle section; a ring of boattail fairing flaps each an outer ring of flaps surrounding the inner ring and projecting downstream from the inner ring, the outer ring flaps being hinged to the inner ring flaps near the downstream end of the inner flaps; a linkage interconnecting the outer ring flaps effective to reduce the diameter of the outer flap ring and thereby the diameter of the inner flap ring upon translation of the operating ring and flaps rearwardly of the jet pipe; the inner ring flaps defining a convergent nozzle section and the outer ring flaps defining a divergent nozzle section and a boattail fairing.

* * * * *

PO-1050
(5/69)

UNITED STATES PATENT OFFICE
CERTIFICATE OF CORRECTION

Patent No. 3,712,547      Dated January 23, 1973

Inventor(s) Charles H. Smale and Esten W. Spears, Jr.

It is certified that error appears in the above-identified patent and that said Letters Patent are hereby corrected as shown below:

Column 4, lines 49 through 53, delete "fixed to an outer ring flap and extending forwardly exteriorly of the operating ring; and means fixed to the jet pipe guiding the forward ends of the fairing flaps for reciprocation axially of the nozzle and thereby further locating the outer ring flaps."

and insert the following -- an outer ring of flaps surrounding the inner ring and projecting downstream from the inner ring, the outer ring flaps being hinged to the inner ring flaps near the downstream end of the inner flaps; a linkage interconnecting the outer ring flaps effective to reduce the diameter of the outer flap ring and thereby the diameter of the inner flap ring upon translation of the operating ring and flaps rearwardly of the jet pipe; the inner ring flaps defining a convergent nozzle section and the outer ring flaps defining a divergent nozzle section and a boattail fairing. --.

Column 5, line 7 through column 6, line 8, delete "an outer ring of flaps surrounding the inner ring and projecting downstream from the inner ring, the outer ring flaps being hinged to the inner ring flaps near the downstream end of the inner flaps; a linkage interconnecting the outer ring flaps effective to reduce the diameter of the outer flap ring and thereby the diameter of the inner flap ring upon translation of the operating ring and flaps rearwardly of the jet pipe; the inner ring flaps defining a convergent nozzle section and the outer ring flaps defining a divergent nozzle section and a boattail fairing."

and insert the following -- fixed to an outer ring flap and extending forwardly exteriorly of the operating ring; and means fixed to the jet pipe guiding the forward ends of the fairing flaps for reciprocation axially of the nozzle and thereby further locating the outer ring flaps. --.

Signed and sealed this 27th day of November 1973.

(SEAL)
Attest:

EDWARD M. FLETCHER, JR.
Attesting Officer

RENE D. TEGTMEYER
Acting Commissioner of Patents